United States Patent Office 3,365,313
Patented Jan. 23, 1968

3,365,313
ANTI-CORROSION COMPOSITIONS
George Leathwhite Roberts, Jr., Lynchburg, Va., and Robert Glenn Fessler, Martinsville, Bridgewater Township, Somerset County, N.J., assignors to American Cyanamid Company, Stamford, Conn., a corporation of Maine
No Drawing. Original application June 11, 1962, Ser. No. 201,278. Divided and this application May 24, 1965, Ser. No. 458,459
6 Claims. (Cl. 106—14)

This application is a division of application Ser. No. 201,278, filed June 11, 1962.

This invention relates to new insoluble organic quaternary ammonium complexes, and to the provision of formulations of the same, suitable for use in colorless or slightly colored anti-corrosion primer coatings.

The complexes of this invention are reaction products of water-soluble non-heterocyclic quaternary ammonium cationic surfactants (i.e., wetting agents) with heteropolyanionic acids. They are highly water insoluble substances which, when applied to metal surfaces from suitable formulations, confer a high degree of corrosion resistance thereto. This property is rather surprising since it is virtually unprecedented to derive an insoluble anticorrosion coating from a chemical material whose most characteristic property is water-solubility.

The possible fields of application of these compounds are manifold. Due to their eventually colorless or pastel appearance, primer compositions may be formulated which may be overcoated with only one coat of even a light colored paint, in contrast to known primers comprising red lead, iron oxide, etc., which normally require multiple overcoats.

The soluble quaternary ammonium compounds useful for the preparation of the insoluble complexes of this invention are well-known in the field of surfactant chemistry. Being of the cationic type, they contain no acidic groupings such as carboxyl and sulfonic acid moieties, although they may contain basic groups such as amino radicals, or such common substituents such as hydroxyl and halogen radicals. The characteristic substituent on the quaternary nitrogen is at least one higher alkyl group or one or more polyoxyalkylene moieties. These, in turn, may be substituted by aryl or alkaryl groups to confer greater hydrophobicity, if desired, or hydrophilic groups such as hydroxyl radicals, if the opposite effect is desired. While it is difficult to enumerate all the useful types of cationic quaternary ammonium surfactants, since these compounds have diverse structures, a particularly useful class of quaternary compounds can be represented by the following general formula:

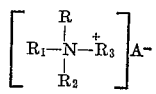

wherein $A^-$ is a water solubilizing anion (e.g., chloride, bromide, perchlorate, etc.); R is lower alkyl (e.g., methyl, ethyl, propyl, butyl, amyl and hexyl); $R_1$ is alkyl having 1–25 carbons (e.g., methyl, octyl, dodecyl, cetyl, cocyl, lauryl, hexadecyl and octadecyl); $R_2$ is either alkyl of more than six carbons, lower oxyalkylene having 1–10 oxyalkylene moieties and terminated by hydrogen, haloalkyl (e.g., β-chloroethyl), amino-(lower alkyl), phenyl, alkylphenyl (e.g., tolyl, nonylphenyl nonytolyl and heptyl phenyl) and monocyclic ar(lower alkyl), e.g., benzyl; and $R_3$ is either alkyl of 1–6 carbons or $R_2$.

The heteropolyanionic acids which are employed in forming the complexes of this invention, have been previously described in the literature. An authoritative description is found in Ephraim, Inorganic Chemistry, vol. I, 3rd ed., Interscience Publ., pp. 495 et seq. (or pp. 512–524 of the 5th ed., 1948).

The chemistry of heteropolyanions is extremely complex. The term "poly acid" is applied to compounds which contain several acidic radicals. When the acid contains only one kind of radical ($H_2Cr_4O_{13}$), it is called an isopoly acid. If it contains more than one kind, the name "heteropoly acid" is applied. The acid anion is named a "heteropolyanion." Only radicals of vanadic, tungstic and molybdic acids unite with radicals of other fairly strong acids or with amphoteric metallic hydroxides to form heteropoly acids. The central radical can be any one of a number of metallic or non-metallic oxides (e.g., $P_2O_5$, $As_2O_5$, $SiO_2$, $TiO_2$). There appears to be no real limit to the number of these compounds. In general, the central oxide is usually in the form of an octahedron and this octahedron is surrounded by any number of radicals from the vanadium, molybdenum or tungsten oxide. Due to their great molecular weight, the determination of structure of these compounds is extremely difficult.

Examples of the inorganic heteropolyanionic acids which are used in this invention are: phosphomolybdic, phosphotungstic, titanomolybdic, arsenomolybdic, silicomolybdic, silicotungstic, silicotungstomolybdic, titanotungstic, phosphovanadic, titanovanadic, zirconomolybdic, zirconotungstic, zirconovanadic, boromolybdic, borotungstic, borovanadic, chromiomolybdic, chromiotungstic and chromiovanadic acids. Of these, the most preferred heteropolyanionic acids are the phosphomolybdic $$(H_3PMo_{12}O_{40})$$

phosphotungstic ($H_7PW_{10}O_{35}$), silicomolybdic $$(H_4SiMo_{12}O_{40})$$

and silicotungstic ($H_4SiW_{12}O_{40}$) acids.

The complexes of this invention can be prepared by the method wherein a water-soluble salt is reacted with an acid to form a water-insoluble salt. Thus the acid from which the heteropolyanion is derived is first prepared in aqueous solution by reaction of a metal oxide with a water-soluble alkali metal or ammonium vanadate, tungstate or molybdate salt at a pH lower than 7 to form a solution of the acid corresponding to the inorganic heteropolyanion. The acid thus formed is then reacted with a quaternary ammonium compound as above defined. The amount of the quaternary compound which is employed to form the complex, should be sufficient to provide three or more moles for each mole of the heteropolyanion. The complex, formed as a water-insoluble precipitate, is removed by conventional methods such as filtration, and then washed and dried.

3

The primer compositions of which the above-described complexes are the active anti-corrosion agents, may be of the conventional type. Normally, these contain three essential components and, optionally, additives to adapt them for special uses. The essential components are: (1) a resin, e.g., an alkyd modified linseed oil, a phenolic resin and a tung oil varnish; (2) a solvent, e.g., xylene and methylisobutylketone; and (3) an anti-corrosion agent. If desired, additives may be incorporated into the primer composition such as driers, wetting agents, dispersants, etc. In general, the anti-corrosive agent comprises about 5–30 weight percent of the primer composition, but more or less may be employed to fit individual requirements.

The present invention is further illustrated by the following examples, in which parts are by weight unless otherwise stated.

*Example 1*

Charge 28.0 parts of molybdic oxide to 1,000 parts of water at 50° C. Add 15.6 parts of sodium hydroxide pellets. This dissolves the molybdic oxide in water. The resultant solution is heated to 80° C. and stirred at this temperature for five minutes. 3.3 parts of sodium silicate solution (28.0% $SiO_2$) is dissolved in 100 parts of water. This sodium silicate solution is added slowly to the sodium molybdate solution. Then 40 parts of concentrated HCl (36% real) is added dropwise to the sodium 12-molybdosilicate solution at 80° C. This addition requires about five minutes. 34.1 parts of a 50% solution of dodecyl trimethylammonium chloride in isopropanol was diluted with 100 parts of hot water (50° C.). The dilute quaternary solution is added to the silicomolybdic acid solution over a five-minute period. During addition, a pale yellow precipitate forms. The resultant suspension is stirred for 15 minutes at 80° C., filtered, washed free of residual acid and dried at 60° C. The resultant powder is ground to less than 40 mesh. Elemental analysis of this product indicates the following composition:

Actual: C, 26.62; H, 5.01; N, 3.13; Mo, 41.93; Si, 0.77; O (diff.), 23.54. Theory: C, 26.40; H, 4.98; N, 2.10; Mo, 42.1; Si, 1.05; O (diff.), 23.45.

*Example 2*

The procedure of Example 1 is repeated except that 18.45 parts of cetyl trimethylammonium chloride are used in place of the dodecyl compound. 48 parts of a pale yellow product are obtained.

Analysis indicates that the following compound was formed:

$[C_{16}H_{33}N(CH_3)_3]_4SiMo_{12}O_{40}$

*Example 3*

A solution of silicomolybdic acid was prepared as in Example 1. 3.0 parts (12.5% real) by weight of a polymeric tertiary amine acid salt sold under the trademark Acrysol-CA by the Rohm and Haas Corp. were dissolved in 100 parts of water. 2.5 parts of the silicomolybdic acid solution was necessary to completely precipitate a white product. This product was filtered, washed acid free and dried at 60° C. 0.7 part of a pale white powder was obtained.

*Example 4*

3.0 parts by weight of a quaternary ammonium compound sold under the trademark Acrysol-CQ by the Rohm and Haas Corp. (12.5% real) were dispersed in 100 parts of water. 2.5 parts of the silicomolybdic acid solution prepared as in Example 1 were required to completely precipitate this product. 0.7 part of a pale white powder was obtained.

*Example 5*

28 parts of molybdic oxide were added to 200 parts of water. 15.6 parts of sodium hydroxide pellets were added to this molybdic oxide suspension and the mixture stirred until a clear solution was obtained. 13.3 parts of titanyl sulfate solution (9.7 grams $TiO_2$ per 100 ml. solution) were added to one liter of water. The pH of the titanyl sulfate solution was 2.25. 45 parts of concentrated HCl (36% real) were added to the titanyl sulfate solution. The molybdate solution prepared above was slowly added to the acid titanyl sulfate solution. The resultant pH was 0.8 and this was adjusted to 5.6 by adding 20 parts sodium hydroxide pellets. 34.1 parts dodecyl trimethylammonium chloride (50% isopropanol) diluted with 200 ml. of water were added dropwise to the acidic 12-molybdosilicate solution. A pale yellow precipitate formed. The resultant suspension was filtered, washed acid free, dried at 60° C. and ground into a powder. 21.0 parts were formed. Analysis indicates that the following compound was formed.

$[C_{12}H_{25}N(CH_3)_3]_4TiMo_{12}O_{40}$

*Example 6*

The procedure of Example 5 was repeated with the exception that 6.1 parts of zirconyl sulfate (33.3% $ZrO_2$) were substituted for the titanyl sulfate solution. The pH's were identical except that the original zirconyl sulfate solution had a pH of 1.8. 20.8 parts of a white powder were formed. Analysis indicated that the following compound was formed.

$[C_{12}H_{25}N(CH_3)_3]_4Zr_2Mo_{12}O_{40}$

*Example 7*

The procedure of Example 5 was repeated except that 24.5 parts of a titanyl sulfate solution (12.5 grams $TiO_2$ per 100 ml. solution) were used in place of the titanyl sulfate in Example 5. 27.5 parts of a pale yellow powder were obtained. The compound of Example 5 was formed in better yield.

*Example 8*

The procedure of Example 1 was repeated except that 30.9 parts of a quaternary ammonium compound of the following structure were used:

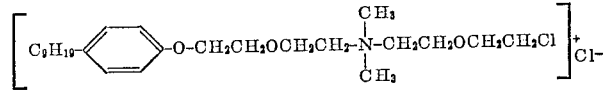

27.8 parts of a pale yellow powder were obtained.

*Example 9*

The procedure of Example 1 was repeated except that 23.8 parts of the quaternary composition of the following constitution were used in place of the dodecyl trimethylammonium chloride:

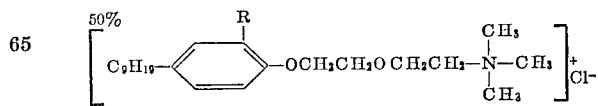

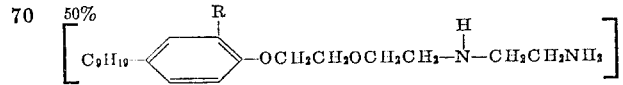

26.6 parts of a pale yellow precipitate were obtained.

Example 10

The procedure of Example 1 was repeated with the following ammonium derivatives:

| No. | Structure | Parts by Weight | Yield |
|---|---|---|---|
| A | $[R-\underset{\underset{CH_2CH_2CH_2NH_2}{\mid}}{\overset{\overset{(CH_3)_2}{\mid}}{N}}]^+ Cl^-$ (R=alkyl of $C_{16}$-$C_{18}$) | 17.0 | |
| B | 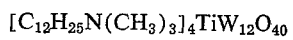—OCH₂CH₂OCH₂CH₂—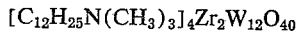 Cl⁻·H₂O (see structure) | 17.0 | 32.5 |
| C | 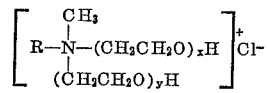 | 17.0 | 36.4 |

Example 11

28 parts of molybdic oxide were suspended in 1,000 parts of water and 15.6 parts sodium hydroxide pellets were added. The resulting suspension was heated to 55° C. until a solution was formed. Ice was added to cool the solution to 25° C. (pH 6.29). 30 parts concentrated HCl was added dropwies (pH 2.08). 8.65 parts $CrCl_3 \cdot 6H_2O$ was added to 200 parts of water and the resultant solution added to the solution of molybdic oxide (pH 2.02). 34 parts of dodecyl trimethylammonium chloride were dissolved in 200 parts of water and the resultant solution added to the solution of chromimolybdate. A yellow green precipitate formed and was stirred half an hour, filtered, washed acid free, dried and ground. 43.9 parts of a yellow green powder were formed. Analysis indicated the following compound was formed.

$$[C_{12}H_{25}N(CH_3)_3]_6Cr_2Mo_{12}O_{42}$$

Example 12

The procedure of Example 11 was followed except that the following metal salts were substituted for the chromium chloride.

| Metal Salt | Parts by Weight | Yield | App. Anion Formula |
|---|---|---|---|
| A. $FeCl_3$ | 5.27 | 47.4 | $[Fe_2Mo_{12}O_{42}]^{-6}$ |
| B. $MnCl_2$ | 6.43 | 40.1 | $[MnMo_6O_{21}]^{-4}$ |
| C. $NiCl_2 \cdot 6H_2O$ | 6.55 | 45.2 | $[NiMo_6O_{21}]^{-4}$ |
| D. $AlCl_3$ | 4.33 | 38.4 | $[Al_2Mo_{12}O_{42}]^{-6}$ |
| E. $Na_2B_4O_7 \cdot 10H_2O$ | 1.2 | 29.0 | $[B_2Mo_{12}O_{42}]^{-6}$ |

Example 13

100 parts of sodium tungstate dihydrate were dissolved in 300 parts boiling water. 1.55 parts boric acid were dissolved in 25 parts of water at the boil. The boric acid was added to the sodium tungstate solution and 75 parts of HCl (36%) were added dropwise to the boiling solution. The solution was cooled. 5.0 parts real of dodecyl trimethylammonium chloride were added to 50 parts of water. The borotungstic solution prepared above was added to the quaternary until precipitation was complete. The resultant suspension was filtered and the solid cake was washed acid free, dried at 60° C. and ground. 5.8 parts of a white powder were obtained.

$$[C_{12}H_{25}N(CH_3)_3]_6B_2W_{12}O_{42}$$

Example 14

39.6 parts sodium tungstate dihydrate were dissolved in 300 ml. boiling water. 6.85 parts titanyl sulfate solution were added and 25 parts hydrochloric acid. A cloudy precipitate appeared and was removed by filtration. A portion of the solution was reacted with five parts real dodecyl trimethylammonium chloride. The procedure of Example 13 was followed and 7.2 parts of a white powder were obtained.

$$[C_{12}H_{25}N(CH_3)_3]_4TiW_{12}O_{40}$$

Example 15

The procedure of Example 14 was followed except that 2.87 parts zirconyl sulfate were used in place of the titanyl sulfate solution. 10.2 parts of a white powder resulted.

$$[C_{12}H_{25}N(CH_3)_3]_4Zr_2W_{12}O_{40}$$

Example 16

The procedure of Example 15 was repeated except that a quaternary of the following formula marketed by Armour and Company as Ethoquad–C–12 was used in place of the amine used therein.

$$\left[R-\underset{\underset{(CH_2CH_2O)_yH}{\mid}}{\overset{\overset{CH_3}{\mid}}{N}}-(CH_2CH_2O)_xH\right]^+ Cl^-$$

R=alkyl derived from coconut oil.
$x$ and $y$ are small whole numbers.

A white powder resulted.

Example 17

In order to show the utility of the complexes prepared in the preceding examples, several were tested as corrosion resistant pigments in primer paint formulations. Primers of the following formula are used to prepare the surface coating:

|  | Parts |
|---|---|
| Rutile titanium dioxide | 1.7 |
| Primer pigments | 1.15 |
| Silica extender (Asbestine 3X) | 5.0 |
| Soya oil modified alkyd resin—approximately 50% resin solids in mineral spirits | 8.8 |
| Mineral spirits | 2.0 |
| Xylene | 6.25 |

The primer pigment used is either zinc chromate or a product of the preceding examples. The mixture described is placed in a ball mill containing 3 mm. glass beads. The mill is rolled for 24 hours. The finished paint is then poured or reduced to spray consistency and sprayed on iron panels. The film is allowed to air dry for half an hour and baked for 45 minutes at 150° C.

In order to test the corrosion resistance of the film, a scratch is made in the center of the film with a sharp pointed instrument in order to expose a thin portion of the iron panel. The panel is then immersed in a warm saturated salt solution for several days. The results for the various primer pigments are listed in the following table:

| Product of Example No. | Immersion Medium | Color | Ratings |
|---|---|---|---|
| None | Sat. Salt—10 days | White | Poor. |
| ZnCrO₄ | Sat. Salt | Deep Yellow | Type.[1] |
| Ex. 1 | do | Off-White | Mod.-less corrosion.[2] |
| Ex. 5 | do | White | Equal.[3] |
| Ex. 6 | do | do | Do. |
| Ex. 8 | do | Pale Yellow | Do. |
| Ex. 9 | do | do | Do. |
| Ex. 10-B | do | White | Do. |
| Ex. 10-C | do | do | Do. |
| Ex. 12-A | do | Yellow | Do. |
| Ex. 12-B | do | Grey | Do. |
| Ex. 12-D | do | Pale Yellow | Do. |
| Ex. 12-E | do | White | Do. |
| Ex. 13 | do | do | Do. |
| Ex. 14 | do | do | Do. |
| Ex. 15 | do | do | Do. |

[1] Type—The corrosion protection afforded with ZnCrO₄, a conventional prime pigment, is herein used as the "type standard" against which the remaining pigments are compared.
[2] Mod.-less corrosion—Less corrosion than noted in "type standard."
[3] Equal—A rating of "Equal" designates a degree of corrosion protection equal in magnitude to the "type standard."

We claim:
1. As a new composition of matter an anti-corrosion primer coating composition comprising a resin, and an organic solvent vehicle and an effective amount of an insoluble organic quaternary ammonium complex wherein the ammonium moiety is the cation of a water-soluble non-heterocyclic quaternary ammonium cationic surfactant; and the anion is derived from a heteropolyanionic acid.

2. The composition of claim 1 wherein the heteropolyanionic acid is a member selected from the group consisting of phosphomolybdic, phosphotungstic, silicomolybdic and silicotungstic acids.

3. The composition of claim 1 wherein the quaternary ammonium moiety is a cationic surfactant of the following formula:

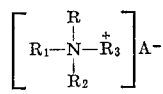

wherein $A^-$ is a water-solubilizing anion, R is lower alkyl, $R_1$ is an alkyl radical of from 1–25 carbons, $R_2$ is selected from the group consisting of alkyl of more than 6 carbons and lower oxyalkylene radicals having 1–10 recurring oxyalkylene moieties and terminated by a member selected from the group consisting of hydrogen, halogen, lower alkyl, amino, phenyl, alkylphenyl wherein any alkyl group has 1–9 carbon atoms and monocyclic ar(lower alkyl); and $R_3$ is a member selected from the group consisting of alkyl of 1–6 carbons and $R_2$.

4. The composition of claim 1 wherein the water-insoluble quaternary ammonium complex is a dodecyl trimethyl ammonium salt of silicomolybdic acid.

5. The composition of claim 1 wherein the quaternary ammonium complex is a cetyl trimethyl ammonium salt of silicomolybdic acid.

6. The composition of claim 3 wherein the acid is a member selected from the group consisting of phosphomolybdic, phosphotungstic, silicomolybdic and silicotungstic acids.

References Cited
UNITED STATES PATENTS

| | | | |
|---|---|---|---|
| 3,079,221 | 2/1963 | Anderson | 252—390 X |
| 3,123,640 | 3/1964 | Longley | 260—567.6 |
| 3,150,086 | 9/1964 | Marsh et al. | 252—390 X |
| 3,201,467 | 8/1965 | Oakes | 252—390 X |
| 3,254,102 | 5/1966 | Swanson | 260—429 |

ALEXANDER H. BRODMERKEL, *Primary Examiner.*

L. HAYES, *Assistant Examiner.*